United States Patent [19]

Haines

[11] Patent Number: 4,969,700
[45] Date of Patent: * Nov. 13, 1990

[54] COMPUTER AIDED HOLOGRAPHY AND HOLOGRAPHIC COMPUTER GRAPHICS

[75] Inventor: Kenneth A. Haines, Kentfield, Calif.

[73] Assignee: American Bank Note Holographics, Inc., Larkspur, Calif.

[ * ] Notice: The portion of the term of this patent subsequent to Oct. 18, 2005 has been disclaimed.

[21] Appl. No.: 257,705

[22] Filed: Oct. 14, 1988

Related U.S. Application Data

[63] Continuation-in-part of Ser. No. 137,179, Dec. 23, 1987, Pat. No. 4,778,262.

[51] Int. Cl.[5] .......................... G03H 1/26; G03H 1/08
[52] U.S. Cl. .................................. 350/3.66; 350/3.76; 350/3.85
[58] Field of Search ....................... 350/366, 376, 3.85, 350/3.81, 320

[56] References Cited

U.S. PATENT DOCUMENTS

| | | | |
|---|---|---|---|
| 3,832,027 | 8/1974 | King | 350/3.5 |
| 4,339,168 | 7/1982 | Haines | 350/3.69 |
| 4,364,627 | 12/1982 | Haines | 350/3.76 |
| 4,411,489 | 10/1983 | McGrew | 350/3.76 |

OTHER PUBLICATIONS

King et al., "A New Approach to Computer-Generated Holography," App. Optics, vol. 9, No. 9, pp. 471-475 (2/70).
Goldstein et al., "3-D Visual Simulation", pp. 25-31 (1/71).
Whitted, "An Improved Model for Shaded Display," Communication of the Assoc. for Computing Machinery, vol. 23, No. 6, pp. 343-349 (6/80).
"Topical Meeting on Holography Technical Digest," 3/31-4/2/86 (cover sheet and three abstracts).
Teitel and Benton, "Anamorphic Imaging for Synthetic Holograms," (Abstract), Journ. of the Optical Society of America, 12/86.
Holzbach, "Three-Dimensional Image Processing for Synthetic Holographic Stereograms," MIT Masters Theses (1986).
Rosen, "Focused-Image Holography with Extended Sources," Appl. Phys. Letters, vol. 9, No. 9, pp. 337-339 (11/66).
Teitel and Benton, "Astigmatic Imaging for Synthetic Holograms," (Abstract), Journ. of the Optical Society of America, (12/86.)

Primary Examiner—Bruce Y. Arnold
Assistant Examiner—Terry S. Callaghan
Attorney, Agent, or Firm—Majestic, Parsons, Siebert and Hsue

[57] ABSTRACT

Methods for generating holograms from a computer model of any object employ a combination of numerical and optical means. An illumination model and the light dispersion properties of the objects are specified. The hologram is synthesized from a plurality of smaller hologram elements. Each individual element sustains a field of view of the object. The light rays from the object lying within the field of view and along the lines of sight are sampled by the computer. The sample density should not exceed the resolution limit set by the size of the hologram element. Each light ray is specified by a direction and an amplitude function. The hologram element is obtainable from a Fourier Transform of the sampled rays. In one embodiment, optical means are employed to physically reproduce the sampled light rays using coherent radiation. The reproduced coherent light rays are then interfered with a coherent reference beam to form the hologram element. Alternatively, the interference pattern is calculated directly by the computer and is printed to form the hologram element.

42 Claims, 7 Drawing Sheets

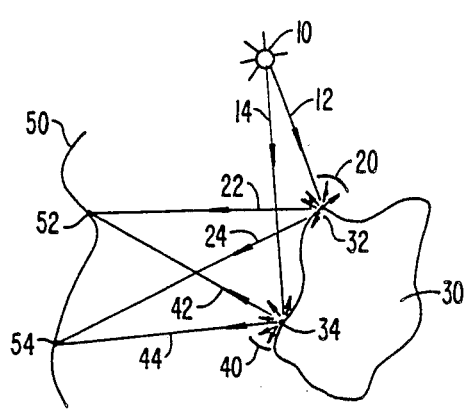
FIG._1.
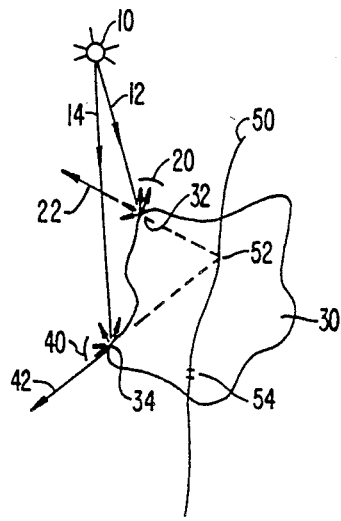
FIG._2.
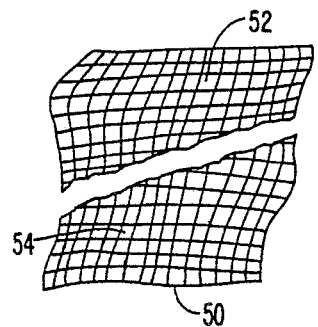
FIG._3A.
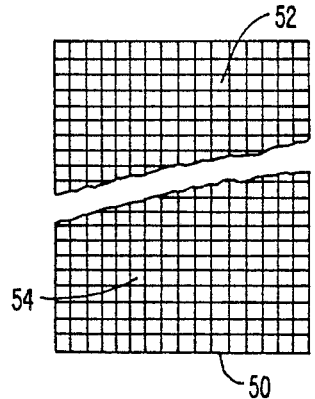
FIG._3B.

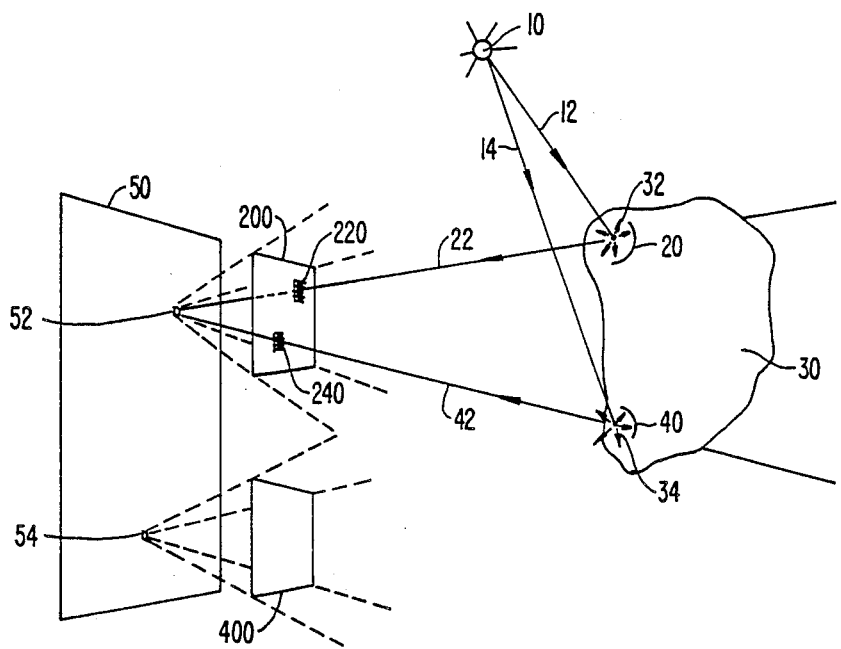
FIG._4.
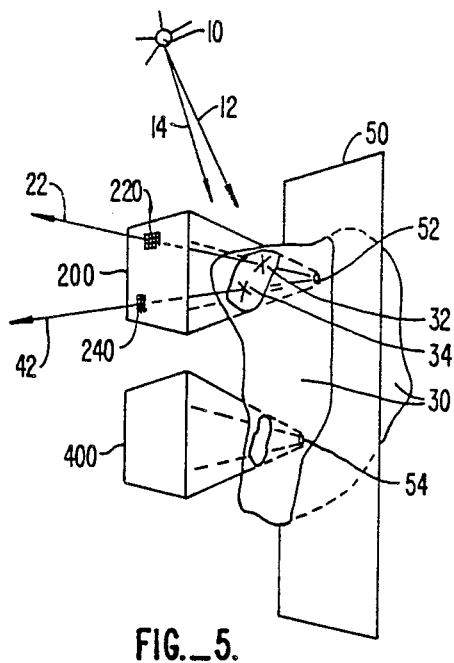
FIG._5.

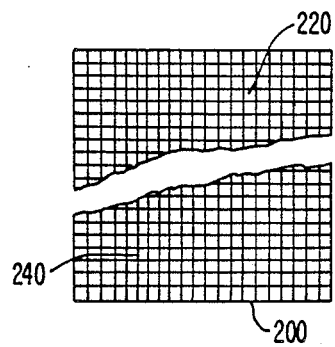
FIG._6.
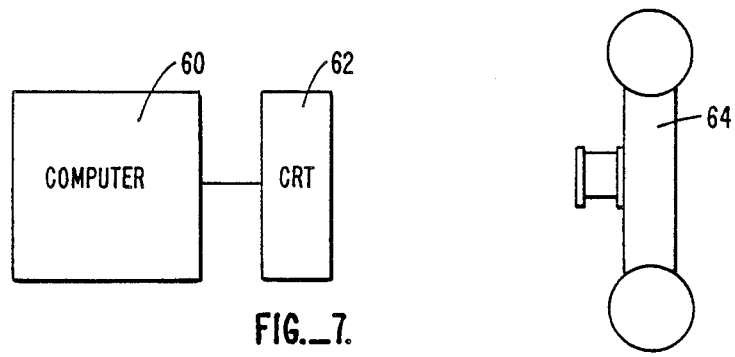
FIG._7.
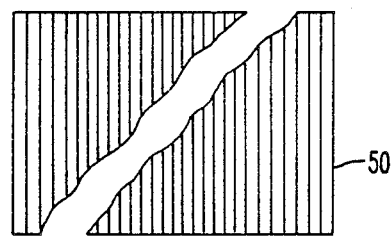
FIG._9.

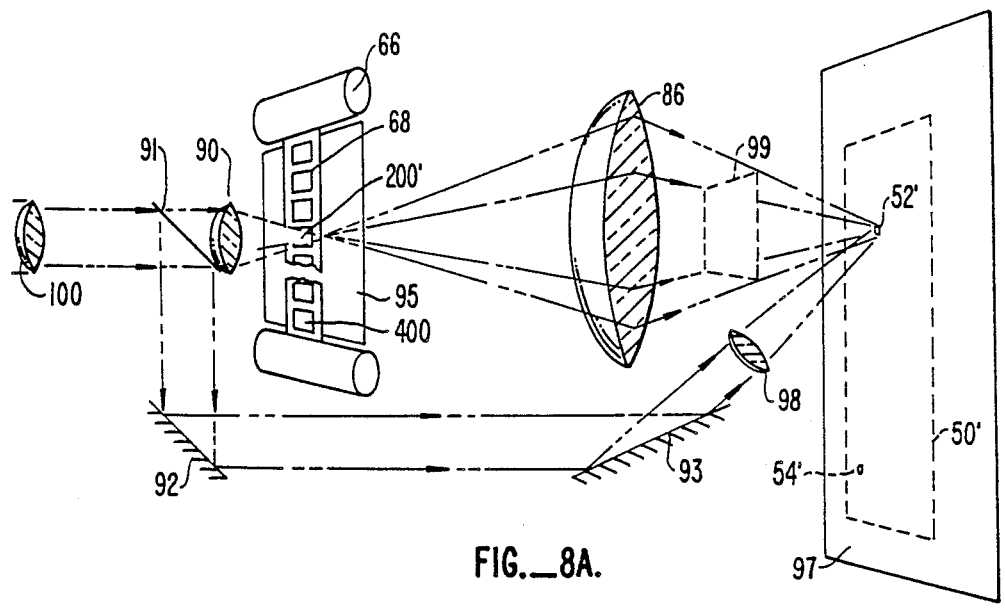
FIG._8A.
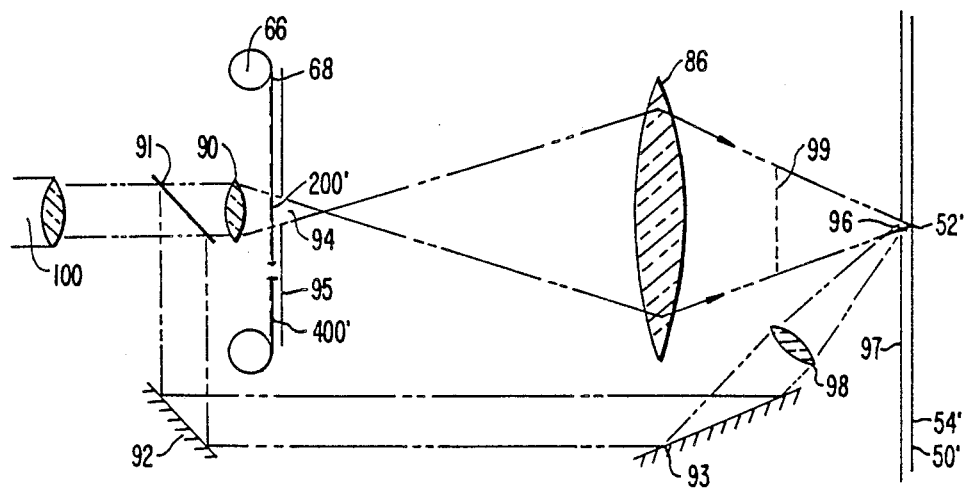
FIG._8B.

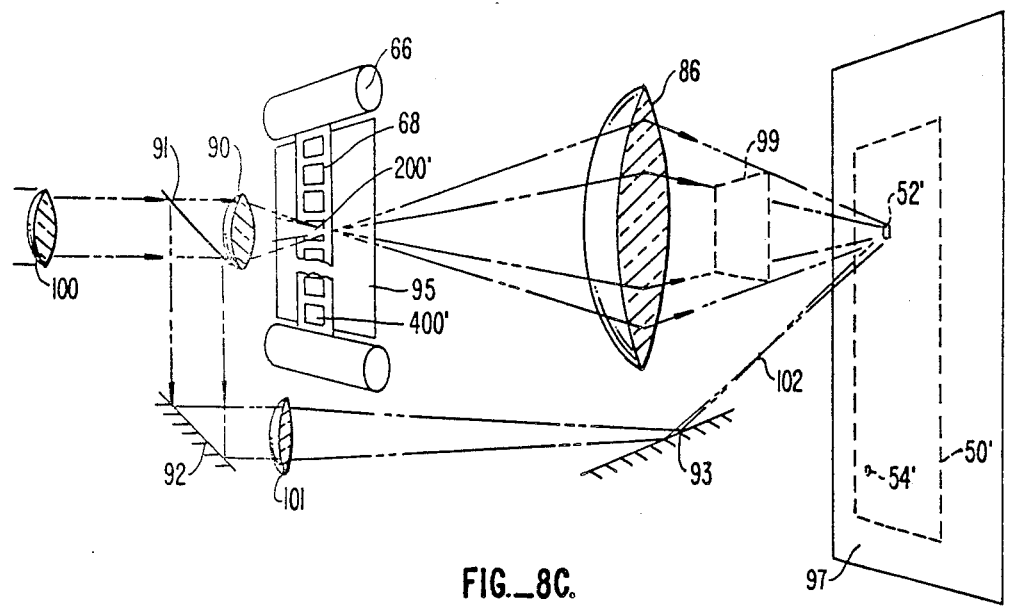
FIG._8C.
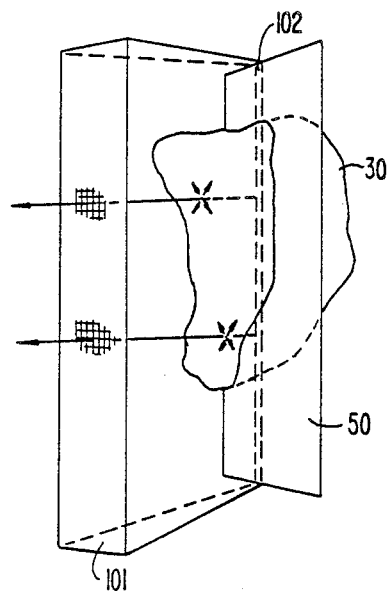
FIG._10.

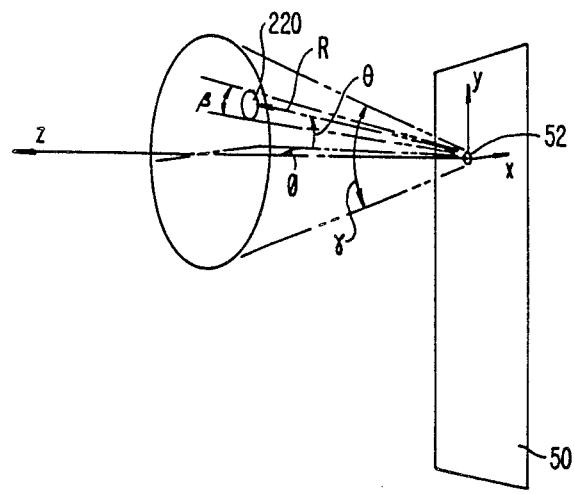
FIG._11.
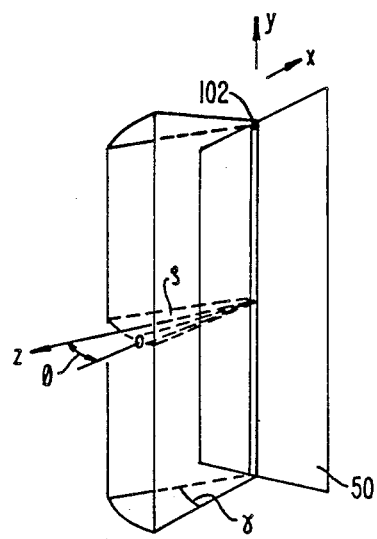
FIG._12.

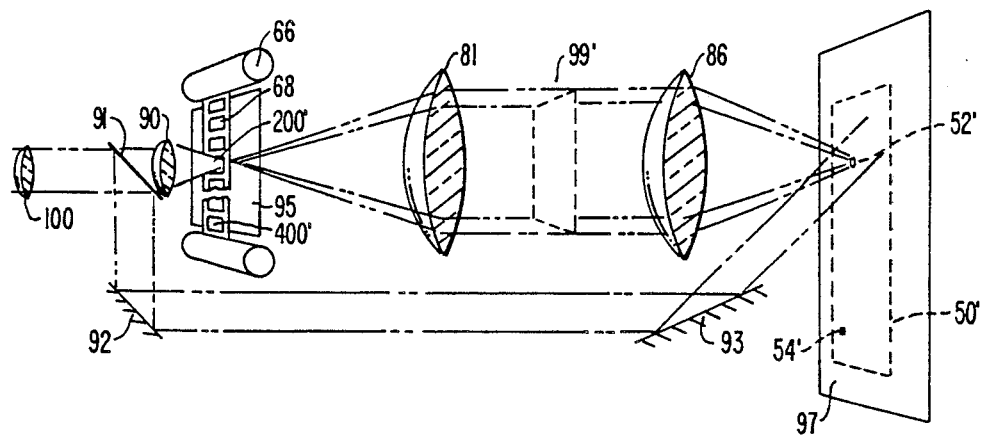
FIG._13.
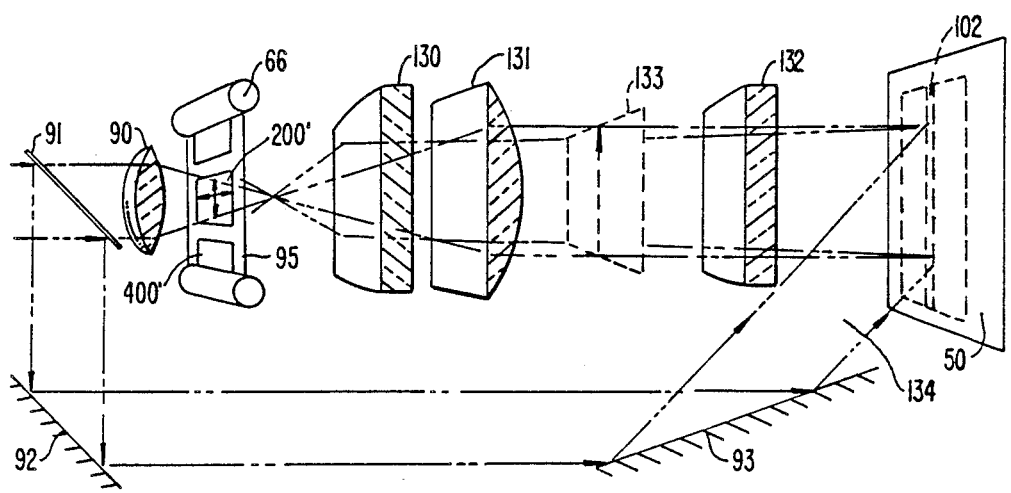
FIG._14.

COMPUTER AIDED HOLOGRAPHY AND HOLOGRAPHIC COMPUTER GRAPHICS

This application is a continuation-in-part of application Ser. No. 137,179 filed Dec. 23, 1987, now U.S. Pat. No. 4,778,262.

Background of the Invention

This invention relates generally to the art of computer aided holography and holographic computer graphics, and more particularly to methods comprising the use of numerical and optical techniques to generate holograms from a computer model of any object.

Holograms are constructed by recording the interference pattern of a coherent object bearing beam and a coherent reference beam. The image of the object is usually reconstructed by directing the same coherent reference beam at the holograms.

Image-plane or focused-image types of holograms are constructed with an image of the object located either very close to or straddling the holographic plate. These holograms have the desirable property that, in reconstruction, the chromatic coherence requirement is relaxed, thus improving the white-light viewing of the holograms.

In practice, it is often impossible to place the hologram recording plate very close to an actual object, and impossible for the plate to be straddled by most objects. Various methods have been used to position an image of the object reconstructed from a hologram at or about the holographic plate. Early focused-image holograms are disclosed by Rosen in his article, "Focused-Image Holography with Extended Sources", published on page 337 of *Applied Physics Letters*, Vol. 9, No. 9, Nov. 1966. The hologram is constructed by placing an image of the object onto the holographic plate by means of a lens system. This technique is simple, but the maximum field of view is limited by the practical f-number of the available lenses.

A common technique for making image-plane holograms without field of view constraints is to employ a two-step holographic method. A conventional hologram, H1, is first made of an object, and then a. real image is reconstructed from it. A second holographic plate is positioned coincident with the real image to make a second, image-plane hologram, H2. Such a two-step technique is disclosed in various forms in U.S. Pat. Nos. 4,339,168, 4,364,627, and 4,411,489. In one form, a hologram consists of a cylindrical array of lenticular holograms, each made from a different viewpoint of the object. The image is reconstructed in the center of the cylinder. A second, focused image hologram may be made by positioning a hologram recording plate at the center of the cylinder, through a real image reconstructed from it, in a second step.

Summary of the Invention

It is an important object of the present invention to provide a technique and system for making a hologram whose object may be represented on and manipulated by a digital computer, and thus having the flexibility of artificial transformation, rendering and animation.

It is another object of the present invention to provide a technique and system for making a hologram whose image is reconstructed very close to or straddling the hologram surface without having to use a lens or a first hologram during construction to image the object onto the hologram surface.

It is yet another object of the present invention to provide a technique and system for making on any given surface relative to the object a hologram whose image is reconstructed without distortion.

These and additional objects of the present invention are accomplished, briefly, by a method wherein the object of the hologram, and the desired holographic surface, are represented by a model expedient for computer manipulation together with information concerning the illumination of the object as well as its reflection and transmission properties. Since the object is represented by a computer model, it lends itself simply to those transformations and animations that are possible with current computer graphics techniques. Furthermore, with a non-real and non-physical object, the holographic surface may geometrically be defined in any location close to the object or even straddled by it.

The holographic surface is logically partitioned into a grid within the computer, where the contribution of light from the object to each grid element is envisioned as a bundle of light rays emanating from each part of the object and converging onto each grid element. The amplitude of each ray of light arriving at a given grid element is determined by the computer by tracing the light ray from the associated part of the object onto the grid element in accordance with the given illumination model. Thus a "tree" of light rays, each in terms of direction and amplitude, is generated for each grid element. Furthermore, since the illumination model can be manipulated on the computer, the rendering of the object can easily be modified. This enables complicated lighting of the object not readily practical by physical means.

In order to construct a hologram element at each grid element, the associated tree of light rays is either physically reproduced using coherent radiation and made to interfere with a coherent reference beam, or this interference pattern is calculated in the computer and is printed point by point, a process which is extremely computationally intensive. Since the original tree of light rays is duplicated, the final reconstructed image will not be distorted. The entire hologram is synthesized by forming, in turn, the hologram element at each grid element on the holographic surface.

This has only briefly summarized the major aspects of the present invention. Other objects, advantages and aspects of the present invention will become apparent from the following detailed description which should be taken in conjunction with the accompanying drawings.

Brief Description of the Drawings

FIG. 1 is a schematic cross-sectional illustration of a hologram being made of a generalized object;

FIG. 2 is a schematic cross-sectional illustration of a modified version of what is shown in FIG. 1;

FIG. 3A illustrates a partition into grid elements on a generalized holographic recording surface that can be employed in the illustrations of FIGS. 1, 2, 4 and 5;

FIG. 3B illustrates a partition into grid elements on a rectangular holographic recording surface that can be employed in the illustrations of FIGS. 1, 2, 4 and 5;

FIG. 4 is a schematic perspective illustration of a specific embodiment of the present invention;

FIG. 5 shows a modification of the embodiment of FIG. 4;

FIG. 6 illustrates the partition into pixel elements of an element of the FIG. 4 and 5 embodiments;

FIG. 7 is a schematic illustration of one possible system that may be employed to record a transparency formed by any of the embodiments of FIGS. 1-6;

FIG. 8A is a schematic perceptive illustration of an example optical setup for constructing a hologram from transparencies made by techniques of FIG. 7;

FIG. 8B is a side cross-sectional view of the optical setup of FIG. 8A;

FIG. 8C is an optical setup similar to that of FIG. 8A, but accomplishing a more exact Fourier Transform relationship between the window of pixel elements and the hologram element;

FIG. 9 illustrates another specific arrangement of elemental holograms formed on a holographic surface;

FIG. 10 shows another specific embodiment of the present invention that allows construction of a hologram according to FIG. 9;

FIG. 11 illustrates an image point in spherical coordinates, and the resolution limit for an image reconstructed from a hologram element;

FIG. 12 illustrates the system in cylindrical coordinates;

FIG. 13 is an optical setup similar to that of FIG. 8A, but accomplishing an exact Fourier Transform relationship between the window of pixels and the hologram element; and FIG. 14 is the anamorphic version of FIG. 13

Detailed Description of the Preferred Embodiments

In all the embodiments described herein, an actual object scene is represented in a computer data base by a number of computer graphics techniques. One method suitable for the present invention is the ray tracing method of Goldstein et al. in their article entitled "3-D Visual Simulation," published in pp. 25-31 in the Jan. 1971 issue of the journal Simulation, the disclosure of which is hereby incorporated by reference.

The method uses a conglomeration of elementary geometric building blocks to model an object in a coordinate space. One such technique divides an object surface into very small areas or three-dimensional object elements (primitives) whose coordinate locations are stored as part of the object data base. In conjunction, an illumination model, which provides information concerning the illumination of the object as well as its reflection and transmission properties, is also specified. That is, the degree of dispersion or diffusion, etc. of each primitive surface element is stated. In this way the amplitude of each light ray as traced by the computer geometrically from a source through reflection at one par&: of the object to a viewer is determined. A typical example of this technique is given by Witted in the article entitled "An Improved Illumination Model for Shaded Display," published at pp. 343-349 of Vol. 23, No. 6, 1980 issue of the journal *Communication of the Association for Computino Machinerv*, the disclosure of which is hereby incorporated by reference.

There are many other techniques of computer modeling which may be incorporated in the methods described herein. Rendering need not be restricted to classical ray tracing methods, but may incorporate surface texturing and a variety of other surface rendering techniques. In fact, most techniques of computer graphics modeling may be used.

FIGS. 1 and 2 are illustrations of two different positionings of a holographic surface 50 relative to an object 30, in order to introduce the concepts of the present invention. The holographic surface 50 is where the hologram of object 30 is to be constructed. Both the object 30 and surface 50 are stored in the computer data base. In general the surface 50 may take on any shape and may be located anywhere relative to the object 30. In FIG. 1 a conventional hologram is constructed since the surface 50 is located away from the object 30. In FIG. 2 an "image-plane" hologram is constructed since the surface 50 is straddled by the object 30. The use of a computer allows the hologram detector surface to be defined to pass through an object, something that cannot, of course, be done with an actual physical detector and object.

Referring to FIG. 3A, the holographic surface 50 is a generalized one that is geometrically partitioned into a grid with grid elements, such as elements 52 and 54. In the preferred implementations of the present invention, the holographic surface 50 is chosen to be a square or rectangular plate with a partition of square or rectilinear grid elements, as illustrated in FIG. 3B. It is conceptually easier to view the hologram as being made up of a large number of contiguous two-dimensional hologram elements wherein one element is constructed at a time. It is also a preferred way of performing the calculations and construction of the hologram as described hereinafter.

Referring again to FIG. 1, consider two viewers on surface 50 located at the hologram grid elements 52 and 54, respectively. One light ray which emanates from a source 10 travels along a path 12 and strikes the object 30 at a surface primitive 32. If the surface primitive 32 is diffusive, it will scatter the light ray into a number of secondary rays with a certain amplitude distribution over a given angle. Only the scattered light rays along the paths 22 and 24 will be seen by the viewers at 52 and 54, respectively. On the other hand, if surface 32 is specular, only one secondary ray will arise which in general will not necessarily be in the line of sight of the viewers at 52 and 54. In the same way another light ray from the source 10 travels along a path 14 and strikes the object 30 at another surface primitive 34. As before, the viewers 52 and 54 will only see the light rays that are scattered into the paths 42 and 44, respectively. Thus, it can be seen that the view from each element on the holographic surface, such as elements 52 and 54, consists of light rays scattered into it from all surface primitives of the object 30.

The description of light interaction with the object need not be confined to surface scattering. If the object is translucent, for example, there will be scattering of light within the object. Generally, the view at each grid element consists of the light rays scattered into it from all parts of the object 30. All of what has been described can be done in a computer using known computer graphics ray tracing techniques to implement the embodiments of this invention being described. Alternatively, these embodiments of the invention can be implemented by application of other known computer graphics techniques.

Referring to FIG. 2, for the case of an image-plane hologram, the holographic plane 50 is positioned in the computer data base through the object 30. Light rays emanating from source 10 such as along paths 12 and 14 strike the object 30 at surfaces 32 and 34, and scatter into a bunch of secondary rays 20 and 40, respectively. The contribution from these rays 20 and 40 to the view of a grid element 52 will only come from the rays which constructions pass through grid element 52, namely, rays along paths 22 and 42, respectively. Thus, associated with each grid element is a view of the object 30, and the view consists of light rays from all parts of the object 30 which constructions pass through that grid element.

The computer is used to sample a representative but discrete distribution of these light rays within each view. Each light ray is characterized in the computer by a direction and an amplitude function. Various means may then be employed to physically reproduce these sampled light rays with coherent radiation having the same directions and amplitudes. In this way, it is as if each grid element of the hologram surface has a view of the object illuminated by coherent radiation. A hologram element is then constructed at each grid element when these reproduced coherent light rays are made to interfere with coherent reference radiation. The entire hologram is finally synthesized by assembling all the constituent hologram elements in the same manner the grid elements are located adjacent each other on the holographic surface 50

Alternatively, one can directly calculate in the computer the actual interference pattern formed and recorded on the hologram 50 by interfering each such reflected ray with an appropriate reference beam ray. However, because of the extremely large number of points in the object, each generating ray that impinges on any given small elemental area of the hologram, and because the amplitude and phase of each such ray must be described, a very large amount of computing power and time is required to accurately directly construct even a small hologram of a very simple object.

The techniques of a preferred embodiment of the present invention systematically select only rays from a limited number of points in the object for use in constructing each appropriate grid element of the hologram. Furthermore, only the direction and intensity of each ray need be considered in generating each hologram element. This comes about because each hologram element is in effect an independent coherently generated hologram. The image generated from each element is only incoherently related to that from other elements. This is similar to composite (multiplex or lenticular) holography and different from classical conventional holography. This independence between elements results in resolution limitations in the image. The resolution is limited by the element size, rather than the hologram size as is normally the case.

It is to be understood that by the term "amplitude" it is generally referred to the complex amplitude where the phase is retained. However, in the context of the preferred embodiment, the amplitude refers to the absolute value of the complex amplitude.

FIG. 11 illustrates the maximum resolution of an image point reconstructed from a hologram element. Any image point such as 220' may expediently be specified in spherical coordinates $(R, \theta, \phi)$. If the elemental hologram 52 has size in one dimension as "a", then the lateral resolution for the image point 220, at distance R from the hologram is approximately limited to $R\lambda/a$, where $\lambda$ is the wavelength of the light used to reconstruct the hologram. Similarly, in the construction of the hologram element as shown in FIG. 5, the same resolution relationship exists between the hologram element 52 and any of the pixel elements such as 220. The lateral size of the unresolved cell is then seen to increase with distance from the hologram. Put in another way, the corresponding angular resolution as denoted by beta in FIG. 11 is limited by the hologram element size, a, to be approximately $\lambda/a$ radians. This is the minimum angle over which no variations in amplitude occur. Thus, the smaller the value of a (and the better the resolution in the hologram plane) the larger are the unresolved elements in the image field as well as in the pixel map. There is no need to retain lateral (x and y) resolution to a greater degree than these limits impose. The number of rays used to calculate each hologram element is then reduced.

While the actual image points resulting from the reconstruction of many adjacent hologram elements may be much smaller than these theoretical limits just specified, the apparent much better resolution is an artifact, depending on how the elements are placed together and how they are illuminated. This apparent finer resolution is not based on actual object data. The actual resolution can, however, be improved by employing more sophisticated methods in which phase information between adjacent hologram elements is calculated. In that case, the hologram elements are no longer incoherent with each other, and greater computing power and time are required.

The axial (Z direction) resolution is similarly reduced. It is approximately limited to the lateral resolution R $\lambda/a$ divided by sin $(\gamma/2)$ where $\gamma$ is the total viewing angle retained in the image and in the entire hologram (see FIG. 11). Thus, for instance, there is no need to specify the object space better than the limit of resolution.

Any computed image which is constructed from data on points spaced much closer together than the limits specified above, is inefficiently created.

In general, according to the present invention, the amplitude of the selected rays reflected by or transmitted through the object are determined by the computer across a surface (not shown in FIGS. 1 and 2) displaced a distance from the object, one such amplitude distribution being determined for each of the defined elemental areas of the hologram surface. The rays from the object that are selected to make up a given amplitude distribution are those that are on a straight line extending between the hologram grid element and its associated window. The size of the windows and their distance from the object define the resulting field of view of an object image reconstructed from the hologram so constructed. The resulting amplitude distribution across such a window is then used to form its respective hologram grid element, either optically or by further computer processing. In either case, however, a physical, optical hologram results from application of these techniques. An image of the computer defined object is reconstructed from the hologram and viewed by an observer in appropriate light.

Embodiments of the present invention shown in FIGS. 4 and 5 introduce a window for each hologram element through which the light rays are sampled within each view. Each hologram surface grid element then sees a restricted field of view of the object through the window. FIGS. 4 and 5 respectively illustrate the implementing of this technique for the case with the holographic surface 50 located away from the object 30 (FIG. 4) and the case with surface 50 straddled by the object 50 (FIG. 5). The windows 200 and 400 serve to define the field of view for hologram grid elements 52 and 54, respectively. In general there exists one window for the view of every grid element. A definite pyramid is formed with the window at the base and the grid element at the apex. All contribution of light from the object 30 to a particular grid element must lie within the pyramid associated with it. Of course, the shape of the windows can be something other than rectangular, such as circular, so something other than a pyramid will result. Also, the window can be defined to be on a spherical or cylindrical surface. The shape is defined by the desired field of view and other characteristics of the resulting hologram.

As a particular implementation of computer sampling, a representative distribution of these light rays from the object 30 is selected by a computer. Each window is partitioned into a screenful of pixel elements. FIG. 6 illustrates the partitioning of one of the windows, such as 200, in which 220 and 240 are individual pixel elements.

Referring again to FIGS. 4 and 5, consider the pyramid defined by window 200 and grid element 52. Each pixel element, such as 220 or 240, may geometrically be regarded as a unit window through which the grid element 52 may see a bit of the object 30. For each pixel element, according to a specific example, the computer employs a visible surface algorithm to trace from the grid element 52 along a line through that pixel element and to determine if the line intersects the object 30. If an intersection is not found, the computer assigns zero amplitude to that pixel element and proceeds to the next one. This iterates until an intersection is found. For example, when the algorithm traces through pixel element 220 along path 22, it will find an intersection with the object 30 at the surface 32. Execution is then passed onto an amplitude processor where the amplitude of the light ray contributed by the surface 32 along the traced line is determined in accordance with the specified illumination model. After assigning the appropriate amplitude value to that pixel element 220, the computer returns once again to apply the visible surface algorithm to the next pixel element. This iteration proceeds until all pixel elements on the window 200 have been considered. Multiple rays striking a single pixel element are averaged in determining that pixel's amplitude value. This procedure is repeated so that every grid element's view of the object 30 is encoded as a pixel map.

A method of performing the calculations for the rays 22 and 42 of FIG. 5, and which involves a coordinate transformation may be easily implemented in the computer. With this method, for each hologram element, such as element 52, a spherical coordinate transformation, with element 52 as its center, is performed on the object field. This transformation need be carried out only on the object points within the field of view spanned by the viewing angle gamma, as shown in FIG. 11. The coordinate of each point in space is specified by $(R,\theta,\phi)$. Once the transformation has been performed, a single view is constructed on the object in much the same way as it is for most standard 3-D graphics systems. The view so constructed then provides the data on the window 200. The view direction is at $\phi=0$, and the view window is $\pm\gamma/2$. Hidden line removal and rendering are then carried out by any of the methods common to computer graphics.

Similarly, in the case with the anamorphic geometry which is described later, cylindrical coordinates $(\rho,\phi,y)$ are most expedient. This is illustrated in FIG. 12.

Once the amplitude across each window is determined, the hologram is constructed one grid element at a time. These hologram elements can be calculated directly by the computer from the amplitude distribution across their respective windows. Alternatively, FIG. 7 schematically illustrates a setup for displaying and making hard copies of each pixel map in a format suitable for physical regeneration of the rays. The computer 60 is connected to an image display such as a cathode ray, tube (CRT) 62 on which the pixel map is displayed. The display format is in the form of a screenful of pixel elements identical to the manner each window was partitioned. The brightness of each pixel element is directly related to the amplitude value associated with it. A camera 74 is used to make a transparency for each window, one for each hologram grid element.

Each window is usually defined to be the same distance from the hologram surface as every other, for convenience and in order to provide a uniform field of view of the object image from the resulting hologram. However, this does not necessarily have to be the case so long as appropriate corresponding adjustments are made when the final hologram is constructed The dimensions of the hologram grid elements should be as small as possible so that they will not be easily visible to the hologram viewer. However, too small a grid element results in a poorly resolved image. Furthermore, the smaller the hologram grid elements, the greater will be the number of required views of the object scene. If grid elements are not overlapped, then each grid element represents a single resolved spot in the hologram plane. But in a preferred embodiment previously discussed, if the grid element is very small, then resolution of points distant from the hologram plane suffers, since it is inversely related to element size.

FIGS. 8A and 8B illustrate schematically a physical setup for "playing back" the transparencies made in the FIG. 7 setup in coherent radiation to recreate the views as seen by the hologram grid elements so as to form holograms in conjunction with coherent reference radiation. The transparencies 68 are played back from a film reel 66 which transport mechanism positions each frame . . . , 200', . . . 400', .. sequentially in front of a window 94 on the mask 95. A coherent source 100 passes through an optical system 90 before projecting the transparency frame 200 through an imaging system 86 onto a holographic recording plate 50 through a window 96 on the mask 97. In the absence of scaling, the window 96 allows a print identical in size to the grid element 52 of FIG. 5. The original field of view is illustrated in FIGS. 4 and 5 by the pyramid in front of grid element 52', and the reproduced field of view is illustrated in FIGS. 8A and 8B by the pyramid in front of recording plate element 52, The imaging system 86 is set up in such a way to reproduce the original field of view at recording plate element 52, An image 99 of the window transparency 200, is formed before the hologram.

With the view reproduced in coherent light at element 52', a reference beam is used in conjunction therewith to form a hologram element there. The reference beam is derived from the same coherent source 100, through a beam splitter 91, a series of positioning mirrors 92 and 93, and an optical system 98, before impinging on recording plate element 52, through the window 96. The recording plate 50, is conveyed by another transport mechanism which is synchronized with that of the film reel 66 so that as frames . . . 200', . . . , 400', . . . are positioned for playback, plate 50, is automatically positioned with elements . . . , 52', . . . , 54', . . . behind window 96 for exposure. In this way, by constructing the hologram element by element, the entire hologram is synthesized.

A preferred embodiment of the present invention is one for which the window 200 of FIG. 5 is placed at a very large distance from hologram 50. Each window pixel element once again represents a ray direction. The pixel information in the window may then be regarded as being equivalent to a Fourier Transform of the hologram element.

FIG. 13 illustrates the optical system used to construct the hologram. It is optimized so as to reflect this Fourier relationship. The lens 86 performs the Fourier transformation exactly if the film 68 (or an image of this film) is placed at a distance from a lens 81 equal to its focal length, and furthermore if the hologram 50' is also placed at a distance from the lens 86 equal to its focal length.

The setup illustrated in FIG. 8A does not have an exact Fourier Transform relationship between, for example, the pixel map 200' and the hologram element 52'. The effect is to introduce some quadratic phase errors to the pixel map and also to the hologram element. Nevertheless, for practical purposes, the setup of FIG. 8A is a good approximation, because the hologram element 52' is very small. In FIG. 8A, the error introduced to the hologram element can be compensated by having the reference illumination point located in the same plane as the image of the grid. Thus, a more exact relationship exists if the reference beam is modified as shown in FIG. 8C. The lens 101 focuses the reference beam into a point 102 which is ideally at the same distance from the element 52' as is the window image 99.

There are alternative arrangements for constructing the composite hologram. For example, if each hologram element contains more than one focal plane resolvable point, then overlapping hologram elements must be constructed so as to account for, and capture all the required rays in the desired viewing angle.

A modification of the embodiment of the present invention enables generation of holograms without vertical parallax. Referring to FIG. 9, the holographic plane 50 is partitioned into vertical strips instead of grid elements. Referring to FIG. 10, the view of the object as seen by a vertical hologram strip 102 is represented by a wedge instead of a pyramid. A window 101 is associated with the strip 102. The ray tracing goes as before except with the stipulation that the trace through a pixel element of each window, such as window 101, and its associated vertical strip, such as strip 102, must be horizontal; that is, in a line normal to the vertical strip. This added ray selection criteria further limits the number of rays that are used to determine the amplitude pattern across the window 101. The imaging device 86 as illustrated in FIGS. 8A and 8B becomes an anamorphic one, such as a cylindrical lens. By the same token, the window 96 on mask 97 is correspondingly of a shape conforming to the vertical strip.

In the case of the vertical strip, a cylindrical coordinate transformation with the strip element along the y-axis is performed on the object field.

An anamorphic system for creating the vertical strip holograms with Fourier Transform relationship is shown in FIG. 14. A cylindrical lens 130 focuses the vertical lines (i.e., horizontal focus only) in the film transparency 200' into the image plane 133, which is further Fourier transformed in the horizontal direction only, by a cylindrical lens 132. Another Cylindrical lens 131 causes the horizontal lines (vertical focus only) of transparency 200' to come to focus in the plane of the hologram strip 102, together with the horizontal Fourier function and the reference beam 134.

Another embodiment of the present invention eliminates the step of making hard copy of the pixel maps. A high resolution electro-optical device is used in place of the transparencies 68 and film reel 66 in FIGS. 8A and 8B. The electro-optical window which is pixel addressable by the computer modulates the transmission of the coherent source 100 through each pixel according to the amplitude value associated with it. This allows each hologram to be created as soon as the computed data becomes available for the electro-optic device. A real-time recording device would enable the entire process to be completed quickly. Some types of photopolymer are useful for this application because they need very little post-exposure processing.

Yet another embodiment of the present invention eliminates the step of making hard copy of the pixel maps. Each pixel map or information equivalent to it is stored in the computer. The corresponding hologram element is calculated from the pixel map as a Fourier Transform. The interference pattern resulting from the Fourier Transform being combined with a coherent reference radiation is then calculated and this pattern is recorded directly onto the hologram recording plate by such means as an electron beam.

The above description of method and the construction used is merely illustrative thereof and various changes of the details and the method and construction may be made within the scope of the appended claims.

It is claimed:

1. A method of constructing a hologram, comprising the steps of:
   providing a computer database of information of at least a portion of an object scene and its illumination,
   defining as computer data and hologram surface with respect to said object scene,
   dividing the hologram surface into a plurality of elemental areas by means of computer specified boundaries,
   determining for each of at least some of said plurality of hologram surface areas, by means of a computer, the amplitude and direction of a selected sample of a plurality of rays emanating from an illuminated object that lie only along straight line paths that pass through the given surface area, and
   constructing a plurality of holograms on a common holographic detector, each of said holograms being formed by redirecting onto the holographic detector the determined amplitude and direction of the sample of rays associated with a corresponding one of the plurality of hologram surface contiguous elemental areas,
   whereby a completed hologram is formed that is capable of reconstructing an image of said object scene.

2. A method of constructing a hologram, comprising the steps of:
   providing a computer database of information of at least a portion of an object scene and its illumination,
   defining a hologram surface with respect to said object scene,
   dividing the hologram surface into a plurality of contiguous elemental areas, defining a window at a distance from said hologram for each of at least some of said hologram surface elemental areas, calculating an amplitude variation across each of said windows by collecting rays emanating from the object scene along substantially only straight line paths that pass through both its associated window and hologram surface elemental area, and constructing a hologram in each of at least some of said elemental areas by use of the amplitude variation across its associated window, whereby a completed hologram is formed that is capable of reconstructing an image of said object scene.

3. A method according to claim 2 wherein the step of defining a hologram surface includes the step of positioning said surface at least partially coincident in space with said object scene, thereby to construct an image plane hologram.

4. A method according to claim 2 wherein each of said windows is divided into a plurality of pixels whose amplitude is determined by that of at least one of the collected rays.

5. A method according to claim 2 wherein the step of dividing the hologram surface includes the step of dividing said surface into a plurality of narrow, elongated contiguous areas that are joined along their long sides, thereby to construct a lenticular hologram.

6. A method according to claim 2 wherein the step of constructing a hologram includes the steps of constructing an object transparency of the resulting amplitude distribution across each window, and using each transparency as an object to optically make an off-axis hologram.

7. A method of constructing a hologram, comprising the steps of:

forming a computer representation of a geometric shape of an object, and its light dispersion characteristics, defining a holographic surface relative to the object, said holographic surface being made up of a plurality of individually defined surface elements, specifying an illumination and dispersion model for the object, for each of at least some of said hologram surface elements, selecting a representative sample of [said]rays from the object with paths lying along a line extending through the surface element, each such ray being specifiable by a direction and a amplitude function, physically reproducing in light said selected sample of rays associated with each said hologram surface element using a first coherent radiation beam such that said directions and amplitude functions are preserved, directing said reproduced light rays and a second radiation beam coherent with said first radiation as a reference beam to said associated surface element to form an interference pattern thereof, and recording and assembling said interference pattern associated with each said surface element at said holographic surface to synthesize said hologram thereof.

8. A method according to claim 7 wherein the step of defining a hologram surface includes the step of positioning said surface at least partially coincident in space with said object scene, thereby to construct an image plane hologram.

9. A method according to claim 7 wherein the step of dividing the hologram surface includes the step of dividing said surface into a plurality of narrow, elongated contiguous areas that are joined along their long sides, thereby to construct a lenticular hologram.

10. The method according to claim 7 wherein the step of selecting a representative sample of rays comprises the steps of:

defining a plurality of windows that are individually associated with one of said hologram surface elements, thereby establishing a field of view of the object about said elements, each of said windows additionally having a screenful of pixel elements defined thereon, and selecting only those of said rays from the object that have paths lying along straight lines that pass through said surface element and any one of the pixel elements, thereby to determine the amplitudes of such pixel elements.

11. The method as in claim 10 wherein the step of physically reproducing a sample of light rays with coherent radiation comprises the steps of:

for each surface element, making a hard copy of the amplitudes of said screenful of pixel elements of each of said windows, said pixels having amplitudes given by said ray amplitude function thereat, and imaging said hard copy with first coherent light to reproduce said sample of light rays onto a surface element at a holographic detector surface such that said ray directions and amplitude functions are preserved.

12. The method according to claim 11 wherein said surface elements on said holographic surface are in the form of strips such that only those light rays from the object with paths that are perpendicular to said strips and lie along lines therethrough are selected.

13. The method according to claim 10 wherein said surface elements on said holographic surface are in the form of strips such that only those light rays from the object with paths that are perpendicular to said strips and lie along lines therethrough are selected.

14. The method as in claim 7 wherein the step of physically reproducing said sample rays with a first coherent radiation beam comprises the steps of:

modulating said first coherent radiation beam by passing said beam through a screen, said screen having pixel elements of independent transmission factors, and said transmission factors having been adjusted to reproduce said sample of rays thereof, and imaging said modulated first coherent light beam to reproduce said sample of light rays onto said surface element at said holographic surface such that said directions and amplitude functions are preserved.

15. The method according to claim 14 wherein said surface elements on said holographic surface are in the form of strips such that only those light rays from the object with paths that are perpendicular to said strips and lie along lines therethrough are selected.

16. The method according to claim 7 wherein said surface elements on said holographic surface are in the form of strips such that only those light rays from the object with paths that are perpendicular to said strips and lie along lines therethrough are selected.

17. A method of constructing a hologram, comprising the steps of:

providing a computer database of information of at least a portion of an object scene and its illumination, defining as computer data a hologram surface with respect to said object scene, dividing the hologram surface into a plurality of elemental areas by means of computer specified boundaries, determining for each of at least some of said plurality of elemental hologram areas, by means of a computer, the amplitude and direction of a selected sample of a plurality of rays emanating from an illuminated object that lie only along straight line paths that pass through the given elemental hologram area, performing a Fourier Transform on the determined amplitude and direction of the sample of rays for each given elemental hologram area, and constructing a plurality of elemental holograms on a common holographic detector, each of said elemental holograms being formed by recording onto the holographic detector, in combination with a coherent reference radiation, the Fourier Transform of the determined amplitude intensity and direction of the sample of rays associated with each of said elemental holograms, whereby a completed hologram is formed that is capable of reconstructing an image of said object scene.

18. A method of constructing a hologram as in claim 17, wherein the step of performing the Fourier Transform is done optically by means of a lens system.

19. A method of constructing a hologram as in claim 17, wherein the step of performing the Fourier Transform is done numerically by means of a computer.

20. A method of constructing a hologram as in claim 19, wherein the step of forming each of said holograms comprises computing an interference pattern resulting from the combination of the coherent radiation with the Fourier Transform, and recording the interference pattern onto the holographic detector by means of an electromagnetic beam.

21. A method according to claim 17 wherein the step of defining a hologram surface includes the step of positioning said surface at least partially coincident in space with said object scene, thereby to construct an image plane hologram.

22. A method of constructing a hologram as in claim 17, wherein "a" denotes a smaller linear dimension of an elemental hologram, $\lambda$ denotes the wavelength of a reconstructing radiation, and any two adjacent sampled directions are angularly separated by at least $\lambda/a$ radians.

23. A method of constructing a hologram as in claim 17, wherein R denotes the distance from an elemental hologram to a point in space, "a" denotes a smaller linear dimension of the elemental hologram, $\lambda$ denotes the wavelength of a reconstructing radiation, $\gamma$ denotes the angle defining the maximum span of the sampled directions, and any two points along a direction are spatially separated by at least $R\lambda/a$ divided by $\sin(\gamma/2)$.

24. A method of constructing a hologram as in claim 17, wherein the sampled directions are specified in spherical coordinates.

25. A method of constructing a hologram as in claim 17, wherein the sampled directions are specified in cylindrical coordinates.

26. A method of constructing a hologram, comprising the steps of:
providing a computer database of information of at least a portion of an object scene and its illumination, defining a hologram surface with respect to said object scene, dividing the hologram surface into a plurality of contiguous elemental areas, defining a window at a distance from said hologram for each of at least some of said hologram elemental areas, calculating an amplitude variation across each of said windows by collecting rays emanating from the object scene along substantially only straight line paths that pass through both its associated window and hologram elemental area, and constructing a hologram in each of at least some of said elemental areas by performing a Fourier Transform on the amplitude variation across the window associated with each elemental area, and recording, in combination with a coherent reference radiation, the Fourier Transform onto the associated elemental hologram area, whereby a completed hologram is formed that is capable of reconstructing an image of said object scene.

27. A method of constructing a hologram as in claim 26, wherein the step of performing the Fourier Transform is done optically by means of a lens system.

28. A method of constructing a hologram as in claim 26, wherein the step of performing the Fourier Transform is done numerically by means of a computer.

29. A method of constructing a hologram as in claim 28, wherein the step of forming each of said holograms comprises computing an interference pattern resulting from the combination of the coherent radiation with the Fourier Transform, and recording the interference pattern onto the holographic detector by means of an electromagnetic beam.

30. A method according to, claim 26 wherein the step of defining a hologram surface includes the step of positioning said surface at least partially coincident in space with said object scene, thereby to construct an image plane hologram.

31. A method of constructing a hologram as in claim 26, wherein "a" denotes a smaller linear dimension of an elemental hologram, $\lambda$ denotes the wavelength of a reconstructing radiation, and any two adjacent sampled directions are angularly separated by at least $\lambda/a$ radians.

32. A method of constructing a hologram as in claim 26, wherein R denotes the distance from an elemental hologram to a point in space, "a" denotes a smaller linear dimension of the elemental hologram, $\lambda$ denotes the wavelength of a reconstructing radiation, $\gamma$ denotes the angle defining the maximum span of the sampled directions, and any two points along a direction are spatially separated by at least $R\lambda/a$ divided by $\sin(\gamma/2)$.

33. A method of constructing a hologram as in claim 26, wherein the rays are specified by spherical coordinates.

34. A method of constructing a hologram as in claim 26, wherein the rays are specified by cylindrical coordinates.

35. A method of constructing a hologram, comprising the steps of:

providing a computer database of information of at least a portion of an object scene and its illumination, defining a hologram surface with respect to said object scene, dividing the hologram surface into a plurality of contiguous elemental areas, defining a window at a distance from said hologram for each of at least some of said hologram elemental areas, calculating an amplitude variation across each of said windows by collecting rays emanating from the object scene along substantially only straight line paths that pass through both its associated window and hologram elemental area, and constructing a hologram in each of at least some of said elemental areas by performing an one-dimensional Fourier Transform on the amplitude variation across the window associated with each elemental area, said one-dimensional Fourier Transform being applied along only one axis in the plane of the window, and recording, in combination with a coherent reference radiation, the Fourier Transform onto the associated elemental hologram area, whereby a completed hologram is formed that is capable of reconstructing an image of said object scene.

36. A method of constructing a hologram as in claim 35, wherein the step of performing the one-dimensional Fourier Transform is done optically by means of a lens system.

37. A method of constructing a hologram as in claim 35, wherein the step of performing the one-dimensional Fourier Transform is done numerically by means of a computer.

38. A method of constructing a hologram as in claim 37, wherein the step of forming each of said holograms comprises computing an interference pattern resulting from the combination of the coherent radiation with the one-dimensional Fourier Transform, and recording the interference pattern onto the holographic detector by means of an electromagnetic beam.

39. A method according to claim 35 wherein the step of defining a hologram surface includes the step of positioning said surface at least partially coincident in space with said object scene, thereby to construct an image plane hologram.

40. A method of constructing a hologram as in claim 35, wherein "a" denotes a smaller linear dimension of an elemental hologram, $\lambda$ denotes the wavelength of a reconstructing radiation, and any two adjacent sampled directions are angularly separated by at least $\lambda/a$ radians.

41. A method of constructing a hologram as in claim 35, wherein R denotes the distance from an elemental hologram to a point in space, "a" denotes a smaller linear dimension of the elemental hologram, $\lambda$ denotes the wavelength of a reconstructing radiation, $\gamma$ denotes the angle defining the maximum span of the sampled directions, and any two points along a direction are spatially separated by at least $R\lambda/a$ divided by $\sin(\gamma/2)$.

42. A method of constructing a hologram as in claim 35, wherein the rays are specified by cylindrical coordinates.

* * * * *